Nov. 1, 1938.　　　T. E. McDOWELL ET AL　　　2,134,880
SELF EXCITING ALTERNATING CURRENT MACHINE
Filed Aug. 16, 1935
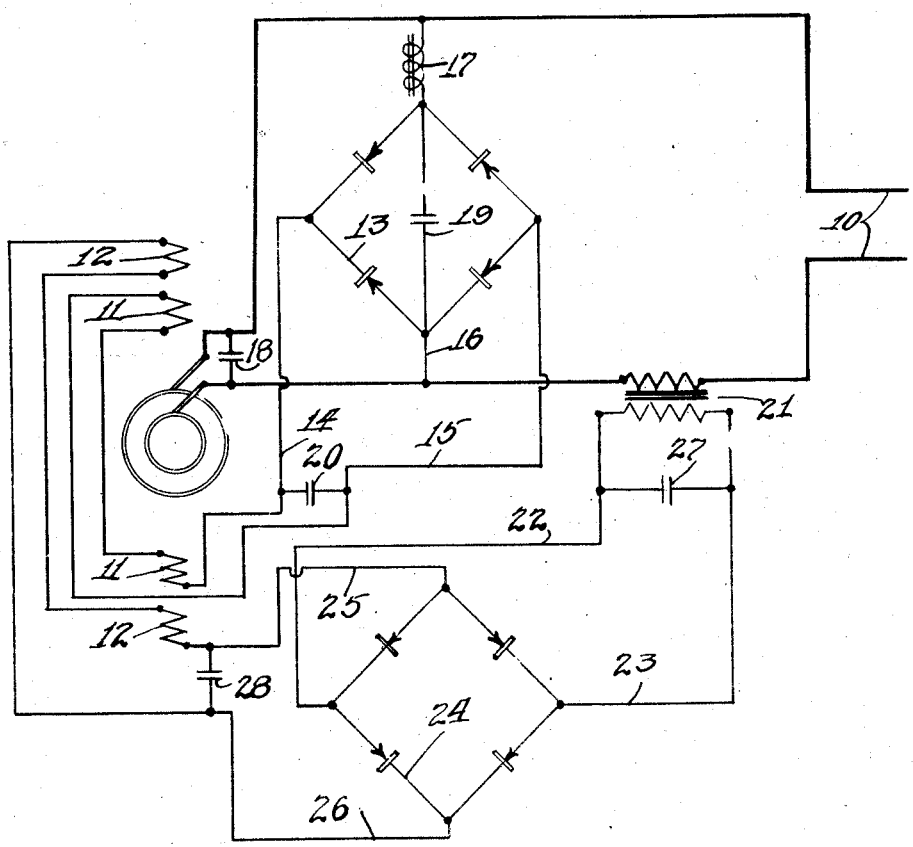
Inventors
Thomas E. McDowell
John G. Howard Patented Nov. 1, 1938

2,134,880

UNITED STATES PATENT OFFICE 2,134,880

SELF-EXCITING ALTERNATING CURRENT MACHINE

Thomas E. McDowell, Oak Park, and John G. Howard, Chicago, Ill., assignors to The Pyle-National Company, Chicago, Ill., a corporation of New Jersey Application August 16, 1935, Serial No. 36,454

3 Claims. (Cl. 171—223)

The present invention relates in general to alternating current machines, such as generators, and is more particularly concerned with the provision of improved means for excitation of the field coils of the machine.

The present invention is particularly adapted for use in connection with train lighting systems, and is of special utility for the furnishing of power for the head light of the locomotive. On the other hand, it will be appreciated by those skilled in the art that it may, with equal facility, be utilized for other purposes where the generation of electricity is required, and moreover, although the invention is disclosed as being embodied in a single phase generator, it is contemplated that the principles of the invention may likewise be embodied in apparatus adapted for multi-phase operation.

Generators for use in connection with train lighting systems, particularly for furnishing power to the locomotive headlight, are constructed to operate at a relatively high frequency, for example, 400 cycles, and generate at normal operation a line voltage of around 32 volts. Generators so constructed are comparatively small and do not take up a great deal of space. This feature is of particular importance in train lighting systems. Moreover, for many reasons, it has been found desirable to use alternating current in this connection rather than direct current which necessitated the replacement of brushes, etc., whereas in the case of alternating current, it is possible to use the inductor type generators, thus doing away with any brushes whatever. It has heretofore been proposed, in order to make the alternating current generator as simple as possible and eliminate the use of auxiliary equipment such as direct current exciters for the field winding, to utilize a rectifier such as the copper oxide type to excite the direct current field windings of the generators, which in the case of the inductor type is arranged to build up from residual.

Although the copper oxide rectifier has been found to be very well suited for this purpose on account of its instantaneous operation as soon as the generator is started, it, however, possesses the inherent disadvantage of being relatively large and requiring a substantial amount of space for its mounting. Moreover, the satisfactory operation of this rectifier is limited to a relatively narrow temperature range, and there have been installations where the rectifier has ceased to function at low temperatures. In seeking to overcome the inherent disadvantages of the copper oxide type of rectifier, it has been found that a rectifier of the copper sulphide type, such as a cupric sulphide rectifier or one having similar characteristics, has many desirable features. This type of rectifier is of smaller size, lower cost, is capable of operation through a wider range of ambient temperatures, and has the inherent advantage of being self healing when the copper sulphide film is punctured.

In attempting to use the copper sulphide type of rectifier, it was found that the rectifier would operate at good efficiency at comparatively low frequencies such as 60 cycles, but that when it was operated at the normal operating frequency of the generators, such as used in connection with train lighting systems, namely 400 cycles, the efficiency of the rectifier would be decreased when an inductive load such as the field of the generator was applied to the rectifier output circuit.

The present invention therefore resides in the general application of this compact lower cost rectifier to alternating current generators and especially to the type utilized in connection with railway lighting equipment, whereby self excitation and desirable operating advantages are secured.

In accordance with the principal features of the invention, it is proposed to provide an alternating current generator of any one of the three well known types, namely, the inductor type, the type having a rotating armature, or the rotating field type. In whichever type is used, the direct current field coils may comprise a main field and an auxiliary field for compound operation, and rectifiers of the copper sulphide type or other type having similar characteristics as are utilized for individually exciting the main and auxiliary fields from the alternating current delivery circuit of the generator. One of these fields, as for example, the main field, may be excited from such a rectifier connected directly across the delivery circuit. It is preferred to excite the auxiliary field from a similar rectifier which has its input circuit connected to the secondary of a transformer having its primary connected in series in the delivery circuit of the generator, so that the auxiliary field will be excited in accordance with the flow of current or load on the delivery circuit of the generator.

In order that the load on each rectifier may be of substantially unity power factor, it is proposed to insert condensers across the respective field windings. Moreover, the operation of the rectifiers is also improved if condensers are inserted across the input circuit of the rectifiers.

An additional feature resides in the provision of means for automatically applying full line voltage to the rectifier which is utilized for exciting the main field winding, when the generator is being started up and is operating on residual, and thereafter, function in such a manner as to apply less than full line voltage to the rectifier as the generator comes up to normal speed and full voltage at normal frequency. This is disclosed as being accomplished by the use of a choke coil which is inserted in the supply circuit to the rectifier. This choke coil, as is well known in the art, will have an increasing potential drop across its terminals as the frequency of the voltage applied thereto and the rectified current is increased.

Other objects and features of the invention will more fully appear from the following detailed description, taken in connection with the accompanying drawing, which illustrates a preferred embodiment thereof and in which:

The drawing diagrammatically illustrates an embodiment of the invention in connection with a compound alternating current generator of the self exciting type.

As shown on the drawing:

In the disclosed embodiment of the invention, the generator armature winding is shown as being connected to an alternating current delivery circuit 10 which may be connected to any desired load, such as a headlight of a locomotive etc.

In the present disclosure, the generator is provided with main direct current field coils 11—11 and auxiliary compound windings embodying field coils 12—12. Although a compound generator has been chosen to illustrate the present invention, it will be readily apparent that the invention may be utilized for generators operating with shunt characteristics.

The main field winding 11 is excited from a bridge rectifier of the cold type having copper sulphide elements, the output circuit of this rectifier being connected to the field windings by means of conductors 14 and 15. One side of the input circuit of this rectifier is connected by conductor 16 to one side of the delivery circuit, and the other side of the input circuit of this rectifier is connected through a choke coil 17 to the other side of the delivery circuit. While a choke coil has been disclosed in this instance, it has been found that a resistance may be utilized instead, and that a resistance under these circumstances gives quite acceptable operation.

The operation of this rectifier is also found to be improved by inserting a capacitance such as a condenser 18 across the delivery circuit at the terminals of the generator windings and a condenser 19 across the input terminals of the bridge rectifier, as well as a condenser 20 across the field windings. These condensers counteract the inductive reactances of the respective windings and result in operation of the rectifier at substantially unity power factor and consequently greater efficiency. Moreover, these condensers also tend to smooth out the ripple in the rectified exciting current.

For the auxiliary winding 12 which is utilized for compounding the field excitation in response to load changes on the delivery circuit, a transformer 21 is connected with its primary in series in the delivery circuit and its secondary connected through conductors 22 and 23 to the supply terminals of the bridge rectifier 24. The output terminals of this rectifier are connected through conductors 25 and 26 to the auxiliary field windings 12—12.

As in the case of rectifier 13, the rectifier 24 is likewise improved in efficiency by inserting a condenser 27 across the input circuit of the rectifier, and a condenser 28 across the output circuit of the rectifier.

In the drawing and description, rectifiers have been disclosed and described as being of the full-wave type. It is contemplated, however, that the invention is not to be limited to the use of full-wave rectification, but that half-wave rectification might be used with equal facility, if desired.

From the foregoing description, it will be apparent that the present invention provides improved means for exciting the fields of alternating current machines, which makes use of low cost, small size rectifying elements of the copper sulphide type; which is so arranged that the rectifiers operate at substantially unity power factor with the result that high efficiency is attained; and wherein the impressed voltage of the main field rectifier is automatically controlled so that line voltage is applied at the time of starting the generator and less than normal operating voltage is applied when the generator has come up to normal operation with normal speed, voltage and frequency.

Now, it is of course to be understood that although we have described in detail a single embodiment of our invention, the invention is not to be thus limited, but only insofar as defined by the scope and spirit of the appended claims.

We claim as our invention:

1. In combination, an alternator having an armature and a field winding, and rectifier means to supply said field winding with an exciting current, said rectifier means comprising a plurality of rectifying elements arranged in a bridge type circuit formation with one pair of apices connected to said armature in series with a reactor and with the other pair of apices connected to said field winding, a first capacitor means connected bridging said one pair of apices and a second capacitor means connected bridging said other pair of apices, said reactor being arranged to selectively affect control of current through said rectifier as the voltage of the alternator varies with speed and field current.

2. In combination, an alternator having an armature and a field winding, and rectifier means to supply said field winding with exciting current, said rectifier means comprising a plurality of rectifying elements arranged in a bridge type circuit formation with one pair of apices connected to said armature and with the other pair of apices connected to said field winding, a first capacitor means connected bridging said one pair of apices and a second capacitor means connected bridging said other pair of apices, and means interposed in series with said one pair of apices to automatically control current therethrough as the voltage of the alternator varies under the combined influences of speed and field excitation.

3. In combination, an alternator having an armature and a first field winding and a second field winding, means to supply said first field winding with exciting current, said means comprising rectifier elements arranged in a bridge type circuit formation with one pair of apices connected to said armature and with the other pair of apices connected to said first field winding, a first capacitor means connected bridging said one pair of apices and a second capacitor means connected bridging said other pair of apices, means interposed in series between said armature and said one pair of apices to selectively affect current flow through said rectifier as the voltage of the alternator varies under the combined influences of speed and field excitation, means to supply said second field winding with exciting current, said means comprising a series transformer having its primary in series with a load output wire and having its secondary connected to a first pair of apices of a bridge circuit formation of a plurality of rectifier elements, the second pair of apices of said bridge circuit being connected to said second field winding, a third capacitor means connected bridging said first pair of apices and a fourth capacitor means connected bridging said second pair of apices.

THOMAS E. McDOWELL.
JOHN G. HOWARD.